United States Patent
McKeown et al.

(10) Patent No.: US 9,207,965 B2
(45) Date of Patent: Dec. 8, 2015

(54) MANAGING MULTI-APPLICATION CONTEXTS

(71) Applicant: International Business Machines Corporation, Armonk, NY (US)

(72) Inventors: Robert J. McKeown, Newburyport, MA (US); Patrick J. O'Sullivan, Dublin (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 242 days.

(21) Appl. No.: 13/913,773

(22) Filed: Jun. 10, 2013

(65) Prior Publication Data

US 2014/0366038 A1    Dec. 11, 2014

(51) Int. Cl.
G06F 9/46     (2006.01)
G06F 9/48     (2006.01)
H04L 29/06    (2006.01)
H04L 12/18    (2006.01)

(52) U.S. Cl.
CPC ............... *G06F 9/461* (2013.01); *H04L 12/18* (2013.01); *H04L 29/06394* (2013.01); *H04L 29/06401* (2013.01); *G06F 9/48* (2013.01)

(58) Field of Classification Search
None
See application file for complete search history.

(56) References Cited

U.S. PATENT DOCUMENTS

2010/0115530 A1*   5/2010   Ahmad et al. ................. 718/108
2012/0005596 A1    1/2012   Carlson et al.
2012/0131321 A1    5/2012   Jitkoff et al.

* cited by examiner

*Primary Examiner* — Qing Wu
(74) *Attorney, Agent, or Firm* — Reza Sarbakhsh; Dermott Cooke

(57) ABSTRACT

A method and system for managing software application states selects a plurality of stateful applications for reinstatement at a later time. A set of data contexts is generated based on the selected applications. The set of data contexts is pushed onto a data stack. Thereafter the set of data contexts is popped from the data stack for reinstatement. Each step or function may be initiated automatically or through user input, and may be used in a single-user, multi-user or collaborative setting.

20 Claims, 2 Drawing Sheets

MANAGING MULTI-APPLICATION CONTEXTS

FIELD OF THE INVENTION

Embodiments of the invention generally relate to computing environments, and more particularly, to managing application states across collaborative environments.

BACKGROUND

A user working within a data context, i.e., a set of active applications with associated data sets to accomplish one or more tasks, is often interrupted by the need to invoke another data context, i.e., other applications, other data sets in the set of active applications, or both, in order to perform an unrelated task. At a later time, the user may wish to return to the first data context. Reinstating the first data context using existing technology is difficult and limited, particularly as the number of applications or data sets grow, as more time elapses between the initial interruption and reinstating the first context, as resources such as memory become more scarce, and as more application state altering events (for example, restarting the operating system) occur. Moreover, current technology is limited in allowing for data context continuity in a collaborative environment (such as an online meeting) across temporal boundaries.

SUMMARY

It is desirable to implement a method and system to allow a user to conveniently save a data context supporting a task, perform a separate thread of activity, and subsequently restore the original data context, including in a collaborative environment.

A method for managing software application states includes selecting a plurality of applications each of which includes a state. A plurality of data contexts are generated based on the selected applications and their respective states. The data contexts are pushed onto a data stack, and are popped at a later time for reinstatement. One or more of the above steps is performed using a program executable by a processor on a computer.

A system for managing software application states, according to an aspect of the disclosed invention, includes a computer having a processor, a computer-readable storage device, and a program embodied on the storage device for execution by the processor. The program has a plurality of program modules, including: a selecting module configured to select a plurality of applications wherein each of the plurality applications includes a state; a generating module configured to generate a plurality of data contexts based on the selected applications and their respective states; a pushing module configured to push the plurality of data contexts onto a data stack; and a popping module configured to pop the plurality of data contexts from the data stack.

A computer program product for managing software application states, according to an aspect of the disclosed invention, comprises a computer-readable storage medium having program code embodied therewith. The program code is readable/executable by a processor of a computer to perform a method including: selecting a plurality of applications, by the processor, wherein each of the plurality of applications includes a state; generating a plurality of data contexts, by the processor, based on the selected applications and their respective states; pushing the plurality of data contexts, by the processor, onto a data stack; and popping the plurality of data contexts, by the processor, from the data stack.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description.

DETAILED DESCRIPTION

Figure 1:
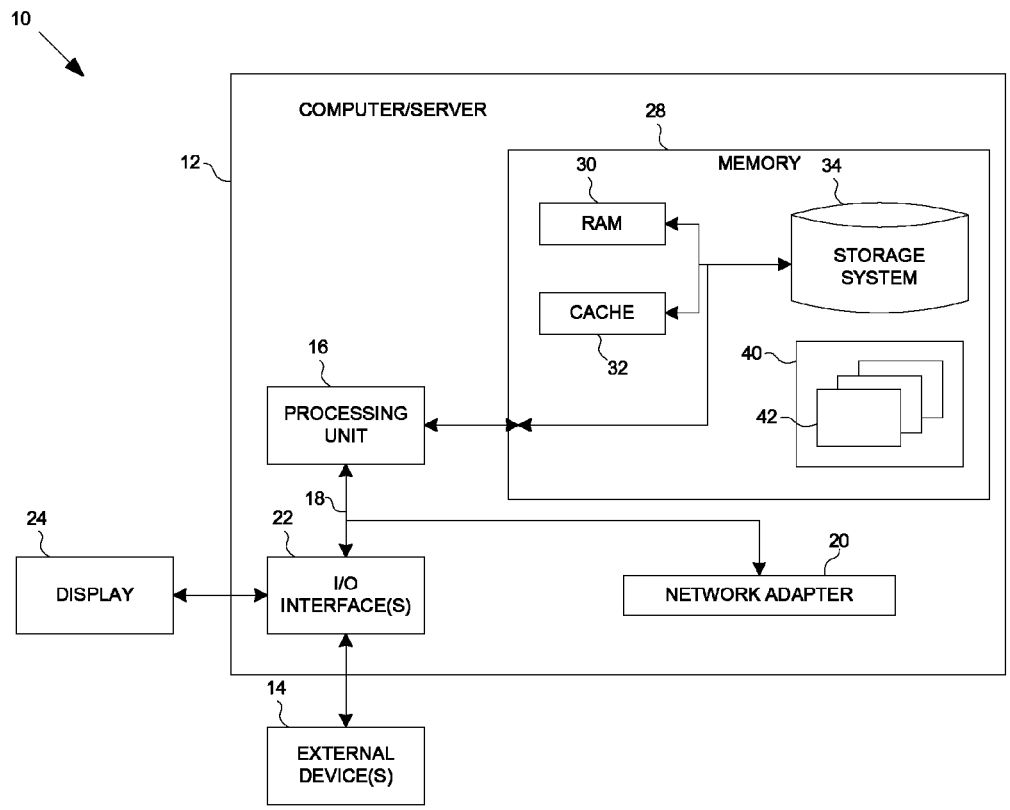
FIG. 1 is a schematic block diagram of an embodiment of a computer system for implementing a method according to an embodiment of the invention.

Referring to FIG. 1, a schematic of an exemplary computing system is shown. The computer system 10 is one example of a suitable computer system and is not intended to suggest any limitation as to the scope of use or functionality of embodiments of the invention described herein.

In the computer system 10, shown in FIG. 1, a computer/server 12 is operational with numerous other general purpose or special purpose computing system environments or configurations. Examples of well-known computing systems, environments, and/or configurations that may be suitable for use with the computer/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. The computer system 10 may be a node in a multi-node computer network, such as those in a data center.

The computer/server 12 may be described in the general context of computer system-executable instructions, such as program modules, being executed by a computer system. Generally, program modules may include routines, programs, objects, components, logic, data structures, and so on that perform particular tasks or implement particular abstract data types. The computer/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, the computer/server 12 in the computer system 10 is shown in the form of a general-purpose computing device. The components of the computer/server 12 may include, but are not limited to, one or more processors or processing units 16, a system memory 28, and a bus 18 that couples various system components including the system memory 28 to the processor 16.

The bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

The computer/server 12 typically includes a variety of computer system readable media. Such media may be any available media that is accessible by the computer/server 12, and it includes both volatile and non-volatile media, removable and non-removable media.

The system memory 28 can include computer system readable media in the form of volatile memory, such as random access memory (RAM) 30 and/or cache memory 32. The computer/server 12 may further include other removable/non-removable, volatile/non-volatile computer system storage media. By way of example only, the storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 18 by one or more data media interfaces. As will be further depicted and described below, the memory 28 may include at least one program product having a set (e.g., at least one) of program modules that are configured to carry out the functions of embodiments of the invention.

The program/utility 40, having a set (at least one) of program modules 42, may be stored in the memory 28 by way of example, and not limitation, as well as an operating system, one or more application programs, other program modules, and program data. Each of the operating system, one or more application programs, other program modules, and program data or some combination thereof, may include an implementation of a networking environment. The program modules 42 generally carry out the functions and/or methodologies of embodiments of the invention as described herein.

The computer/server 12 may also communicate with one or more external devices 14 such as a keyboard, a pointing device, a display 24, etc.; one or more devices that enable a user to interact with the computer/server 12; and/or any devices (e.g., network card, modem, etc.) that enable the computer/server 12 to communicate with one or more other computing devices. Such communication can occur via Input/Output (I/O) interfaces 22. Still yet, computer the system/server 12 can communicate with one or more networks such as a local area network (LAN), a general wide area network (WAN), and/or a public network (e.g., the Internet) via a network adapter 20. As depicted, the network adapter 20 communicates with the other components of the computer/server 12 via the bus 18. It should be understood that although not shown, other hardware and/or software components could be used in conjunction with the computer/server 12. Examples, include, but are not limited to: microcode, device drivers, redundant processing units, external disk drive arrays, RAID systems, tape drives, and data archival storage systems, etc.

Figure 2:
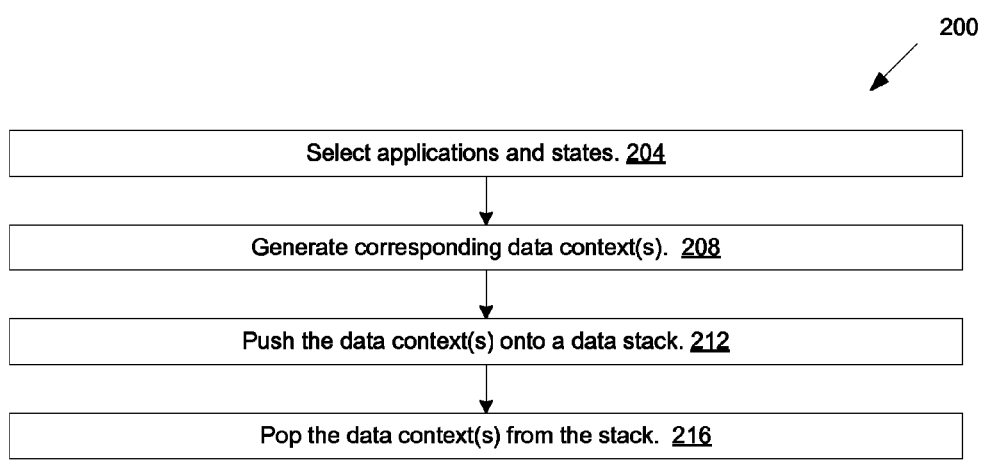
FIG. 2 is a flow chart diagram of a method executable by the computer system depicted in FIG. 1, according to an embodiment of the invention.
Figure 3A:
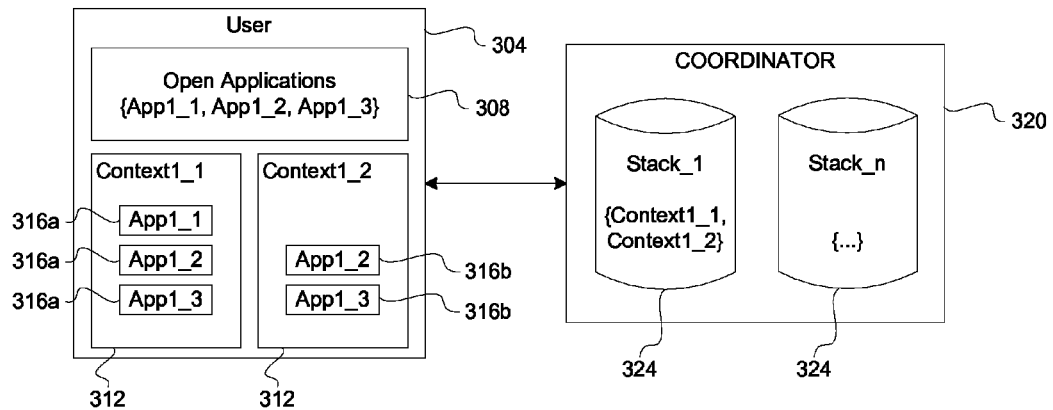
FIG. 3A is a schematic block diagram depicting a single user environment using the method depicted in FIG. 2, according to an embodiment of the disclosed invention.
Figure 3B:
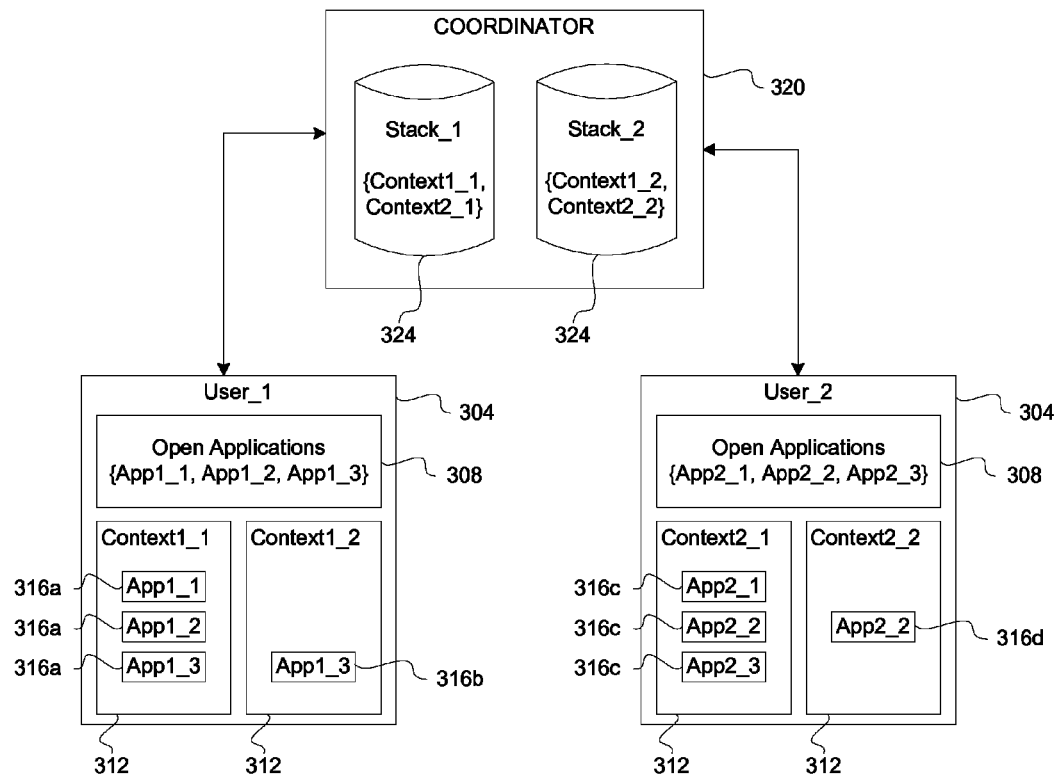
FIG. 3B is a schematic block diagram depicting a multi-user environment using the method depicted in FIG. 2, according to an embodiment of the disclosed invention.

Referring now to FIGS. 1-2, a method 200 according to an exemplary embodiment of the disclosed invention may be deployed as a program 40 on a computer, such as the computer system 10, as depicted in FIG. 1. In step 204, the method 200 may select one or more open or active applications, each application having a state, for reinstatement at another time (or when certain conditions are met). Illustrative and non-limiting examples of such applications include: in general, desktop or mobile applications; email clients, spreadsheet and word processors, instant messaging clients, document libraries, web browsers, multimedia players, and utilities. Illustrative and non-limiting examples of application states include: open and/or active documents (such as text files in a word processing application, or email message windows in an email client) and associated meta data, application preferences, display preferences (such as window/display zoom level, window and panel arrangements, designation of one window as active, etc.), shortcuts (such as customized keyboard shortcuts), database connections, position information in multimedia files (such as time elapsed in audio or video files), and contact connections (such as active chat, video or audio connections between users). References to applications herein (including open, active, or selected applications) include such applications and their respective states and data sets.

With continued reference to FIG. 1-2, according to one exemplary embodiment of the invention, the selection function of the step 204 may be facilitated in a number of ways, including, without limitation, through user input or through predefined instructions.

The selection step 204 of the method 200 may be initiated by a user of the system 10 while performing a first set of related tasks. For example, the user may be editing two text documents in a word processor, reviewing emails in an email client, viewing a website in a web browser, and chatting with a colleague using an instant messenger, as part of working on a presentation. At some point during the performance of these tasks, the user may wish to work on a second set of tasks, the performance of which may necessitate opening additional applications and/or additional data sets in currently active applications. Doing so may clutter the user's digital workspace on the system 10 (for example, on the display 24) and/or reduce the system's 10 performance (for example, by reducing the amount of available RAM memory 30) and lead to loss of productivity. Closing the applications and data sets associated with the first task-set to accommodate the performance of the second task-set may be undesirable, since reopening those applications and data sets at a later time may be inefficient, time consuming, and error prone. To avoid these and related problems, the user may select one or more of the applications and data sets related to the first task-set for reinstatement. Although the preferred embodiment of the disclosed invention facilitates reinstatement of applications used to perform related tasks, the selected tasks need not be related in any way. It is sufficient that the user intends for a set of applications to be grouped together in some fashion, using the disclosed invention.

Where the selection function of step 204 is facilitated through user input, a selection functionality may (without limitation) be provided as a menu command link or a keyboard shortcut for applications run on the system 10, similar to functionalities such as the open, save and print functions seen in menu bar options of nearly all modern desktop applications. According to one embodiment, activating the menu command link or keyboard shortcut may select all data sets (such as open windows, preferences, metadata, etc.) associated with the application from which the link or the keyboard shortcut is activated. For example, taking such action while working with a word processor may select the open text documents and other data associated with the word processor, but not other open applications or data sets. According to another embodiment, activating the menu command link or keyboard shortcut may select all open applications and data sets on the system 10. According to yet another embodiment, the scope of such selection may be configurable by a user through, for example, a system preferences option, which may be configured at any time (for example, through a configuration window) before executing the method 200, at the time of application selection in step 204, or both. When the scope of such selection is configurable at the time of selection in step 204, activating the menu command link or the keyboard shortcut may cause the system 10 to display a window to the user with a prompt, allowing the user to determine the scope of the selection by clicking on a checkbox associated with each of the open applications and data sets. The functionalities described herein may be implemented at the application level, the operating system level, or both.

In a related embodiment, the selection functionality of the method 200 may be provided by a stand-alone application interacting with the operating system and the other computer programs 40 that run on the system 10. The stand-alone application may present the user with the same functionality and configurability as those described above in connection with other embodiments of the invention. Its settings may be configured at any time by the user, through activating and interacting with the application.

With continued reference to FIGS. 1-2, in an embodiment where the selection function of step 204 of the method 200 is facilitated through predefined instructions, such instructions may be defined as part of the code for the program 40 implementing the method 200. For example, the method 200 may include predefined instructions to select, for reinstatement, all applications open on the system 10 five minutes before a scheduled reboot of the system 10. According to this embodiment, the selection step 204 is automatic and is initiated without direct user input (although the user may be allowed to modify this functionality by, for example, defining the scope of the selection or the schedule for its performance).

Referring now to FIGS. 1-3A, a user 304 may be working with a set of open applications 308 (for example, App1_1, App1_2, and App1_3) running on the computer system 10. In step 204, the user 304 may choose, at some point, to save some or all of the open applications 308 for reinstatement, and may do so by selecting them (for example, by pressing a keyboard shortcut that globally selects the multiple applications open on the system 10) and their respective states (for example, the open windows, documents, preferences, metadata, etc. that are associated with the open applications) for reinstatement. Alternatively, the selection may be initiated automatically after certain predefined conditions are met. For example, where the system 10 is close to rebooting for pre-scheduled maintenance, the operating system may initiate the method 200 to save the user's 304 work.

With continued reference to FIGS. 1-3A, the method 200 may generate a first data context 312 in step 208, based on the selected applications 316*a* (including their respective states), selected in step 204. According to an exemplary embodiment of the disclosed invention, the data context 312 contains information about the selected applications 316*a* (including their respective states), but does not contain a copy of them. The data context 312 may include the names and file paths (or memory locations) for the open applications 308 (including their respective states), as well as for their preference files and other information associated with them. The data context 312 may further include relevant time information, such as the time at which the data it references was selected in step 204, or the time at which the data context 312 itself is created. It may further include user information, security and sharing information, as well as program version and operating system information.

The amount and type of information that should be stored in the data context 312 depends in large part on the specific environment in which the method 200 is deployed, the nature of the selected applications themselves, and what constitutes sufficient information for reinstatement. According to another embodiment of the invention, the context 312 may include the actual selected data, such as the selected open applications 308 and their respective states.

With continued reference to FIGS. 1-3A, in step 212, the method 200 communicates the generated first data context 312, also referred to as Context1_1, to a coordinator 320. The method 200 pushes Context1_1 onto a data stack 324, such as Stack_1. The coordinator 320 may track the generated context 312, any existing data contexts 312, and any others that the method 200 may generate at a later time, using one or more data stacks 324 (for example, Stack_1 through Stack_n). Pushing the data context 312 onto the data stack 324 facilitates the tracking, grouping, and reinstatement of the underlying application data and their states in other steps of the method 200. The coordinator 320 may designate Stack_1 as the active or default data stack, such that any subsequent data context 312 pushes in step 212 will push the corresponding data context 312 onto Stack_1. Alternatively, the coordinator may generate or designate another data stack 324 as the default data stack, through input from the user 304, or according to predefined instructions, or both. According to a related embodiment, the data stack 324 to which a generated data context 312 is pushed may be set or modified by the user 308 and/or according to predefined instructions.

Additionally, the data stack 324 may be manipulated using standard techniques such as branching, duplicating, labeling, etc., according to the needs of the particular embodiment in which the invention is used.

With continued reference to FIGS. 1-3A, the selection step 204 of the method 200 may again be initiated by the user 304 (or automatically, according to another embodiment), to select App1_2 and App1_3, but not App1_1, for reinstatement. In step 208, the method 200 may generate a second data context 312, also referred to as Context1_2 in FIG. 3A, containing information about the selected applications 316*b*. In step 212, the method 200 pushes Context1_2 onto the active data stack 324 (for example, Stack_1). A user's 304 or the system's 10 choice of which data stack 324 to use when pushing a data context 312 in step 212 depends on many factors, including, without limitation: the degree of similarity between the data contexts 324 (such as shared users or permissions), the time at which they are pushed, and whether they pertain to the same or related tasks.

With continued reference to FIGS. 1-3A, the user 304 may initiate the popping step 216 to reinstate a data context 312 from a data stack 324. Alternatively, the method 200 may initiate the step 216 automatically when certain predefined conditions are met. For example, the method 200 may pop a data context 312 associated with a particular task every day at a predetermined time. In a more specific example, the user 304 may wish to work on a particular financial report between 9:00-11:00 a.m. every day. The work may require the user 304 to have several applications and spreadsheets open for this purpose. The user 304 may manually initiate the popping step 216 every morning at 9:00 a.m. (and likewise may manually initiate the pushing step 212 at 11:00 a.m. when the allotted time for work on the financial reports is complete) or may create a schedule for daily reinstatement (and/or daily pushing) of the relevant data stack 312. In a related embodiment, initiation of the popping step 216 may be a preconfigured function of the operating system or any other program 40 operating on the system 10.

Referring now to FIGS. 1-3B, and FIG. 3B in particular, an alternative embodiment of the disclosed invention may include one or more users 304 (for example, User__1 and User__2) collaboratively interacting on a computer network, and each using one of two systems 10. The users 304 may further be connected to a third system 10 functioning as a server. Alternatively, and without limitation, one of the two users' 304 systems 10 may operate as a server in addition to facilitating its respective user's 304 work. The collaboration may be, for example, an online meeting between the two users 304. User__1 may be running the following applications: App1__1, App1__2, App1__3. User__2 may be running the following applications: App2__1, App2__2, App2__3. These applications may be identical across the network (for example, App1__1 and App2__1 may be the same application), or they may be entirely different.

During the course of the collaborative meeting, User__1 may, through initializing step 204 of the method 200, select the group of applications 316a for reinstated at another time. In step 208, the method 200 generates a data context 312 for User__1, which may be designated, for example, as Context1__1, in the same manner as described in connection with FIG. 3A. The method 200 may further generate a second data context 312 based on User__2's running applications, which may be designated as Context2__1. According to one embodiment of the invention, the method 200 may prompt User__2 (the non-initiating user) to select a set of applications 316c running on User__2's system 10 in creating Context2__1. Other embodiments may automatically select the applications 316c based on a preconfigured set of instructions (for example, the method 200 may be preconfigured to select all running applications on User__2's system 10).

The method 200 generates a data stack 324 designated, for example, as Stack__1 and pushes each data context 312 (Context1__1 and Context2__1) onto Stack 1, through the coordinator 320. Information contained in Stack__1 may reside on a system 10 that acts as a server, and the server may be different from the systems 10 in use by User__1 and User__2. Alternatively, one of the two systems used by User__1 and User__2 may act as the server. In yet another alternative embodiment, both systems 10 may store the Stack__1 information. Stack__1 contains information necessary to reinstate each user's 304 running applications (which include their respective states, as defined above) through the method's 200 other steps at another time. Each user's 304 data context 312 may be pushed onto Stack__1 as it is generated, or at the same time once both are generated. As described in connection with FIG. 3A, the generated data contexts 312 may contain application states as well as version, permissions, sharing, preferences, time and other associated information.

During the course of the collaborative meeting between User__1 and User__2, User__2 may decide to save a second set of applications (which may overlap with the first set) for reinstatement at another time. User__2 may initiate the method 200 and select, in step 204, one running application 316d. In step 208, the method 200 generates a data context 312 designated as Context2__2 based on the selected application 316d. The method 200 may also generate a second data context 312 based on User__1's selected application 316b, designated as Context1__2. By way of example, the need for the two users 304 to save different applications may arise when User__1 is running a spreadsheet application and dictating notes to User__2, who is typing the notes on a word processing application. While each user 304 runs different applications, in this example, the users 304 may decide that their respective tasks are related, and should be saved for reinstatement at another time.

Based on the data contexts 312 generated in step 208, the method 200 pushes the data contexts 312 in step 212 onto a second data stack 324, designated, for example, as Stack__2, through the coordinator 320. For each data stack 324, the corresponding actual data referenced and tracked by the data contexts 312 within that data stack 324 (such as the applications, their states, and related data sets) may be stored locally on each user's 304 system 10.

Each user 304 may decide, at any point, to reinstate one or more of the data stacks 324 tracked by the coordinator 320, by initiating the popping step 216 of the method 200. For example, User__1 may decide to pop Stack__1. The method 200, by analyzing Stack__1, may determine that it is shared with User__2, and therefore may attempt to locate User__2. If User__2 is not located, or is not interested in resorting Stack__1 on User__2's system 10, the method 200 may pop Stack__1 locally on User__1's system 10. The method 200 performs the popping step 216 by reinstating those applications, application states, and data sets identified in Context1__1, which is the data context 312 associated with User__1. Context2__1, which contains information for User__2, is not used in the popping step 216. However, if User__2 is available and agrees to the restoration, then the method 200 may pop Stack__1 on both User__1's and User__2's systems 10, with Context1__1 reinstated for User 1, and Context2__1 reinstated for User__2. Where User__2 is not an initiating user 304 (i.e., where User__2 did not initiate the pop), the method 200 may ascertain User__2's agreement to having its corresponding data context 312 restored by presenting User__2 with a prompt. Alternatively, the method 200 may ascertain User__2's agreement according to a predefined configuration, such as User__2's saved preferences. User__1 and User__2 may similarly initiate the popping step 216 to pop Stack__2 in the same manner as the reinstatement for Stack__1.

With continued reference to FIGS. 1-3B, according to an exemplary embodiment of the disclosed invention, a generated data context 312 may contain two sets of information about the applications, application states, and their data sets that are referenced in the data context 312: a View State, which references the application, window, and/or data set(s) that are active or in focus; and a Model View, which includes the underlying data state. For example, where User__1 selects a word processor application having one text document open in step 204, the method 200 may designate the application and the corresponding on-screen window placement information as the View State, and the contents of the text file as the Model View of the data context 312 that is generated in step 208 (and pushed in step 212). Between the time that the method 200 generates and pushes the data context 312 in steps 208 and 212, and when that data context is popped in step 216, the underlying data may change. For example, User__1 may change the contents of the text document after it has been referenced in a pushed data stack 324, but before it is popped again in step 216. Therefore, there may be a conflict between the pushed state and the popped state. These conflicts may be resolved using version control and conflict resolution techniques which are well-understood by a person of ordinary skill in the art. Version control solutions used in embodiments of the disclosed invention may optionally use, for example, binary copies of Model States to facilitate conflict resolution.

According to an alternate embodiment of the invention, User_1 and User_2 may share the same Model State information but have different View States, and vice versa. For example, both User_1 and User_2 may be working on a common set of applications, but each of them may have the particular window associated with each selected application placed on a different portion of the user's screen. In this instance, the data context 312 for each of the users 304 may have an identical or similar Model State, but an entirely different View State.

With continued reference to FIGS. 1-3, according to a preferred embodiment of the disclosed invention, each application selected in step 204 provides its own mechanism for saving and reinstating its state (i.e., pushing in step 212 and popping in step 216) after initiation of the relevant step by the method 200.

Non-limiting examples of embodiments that may benefit from the disclosed invention include a meeting between executives or board members of a corporation, students participating in an online classroom, and remote presentations. These recurring collaborative meetings may require participants, each of whom may have different roles as presenters or participants, to run a number of applications and data sets on their respective systems 10. They may wish to save their work at the end of one meeting, and to pick up where they left off at the next meeting. At a corporate board meeting, for example, the board may wish to load the company's financial information at the beginning of each session. The participants may create a schedule for their meeting that includes initiation of the method 200 at a predefined time corresponding to the scheduled meeting time and date. Likewise, they may schedule for the method 200 to save their work at the conclusion of each meeting.

While embodiments of the disclosed invention have been primarily discussed in connection with saving and restoring related tasks, the saved applications and their respective states need not be related in any way. In fact, they may include any application and its respective state that a user 304 wishes to save as part of a particular collection. Moreover, references to collaborative uses of the invention are intended to be exemplary; the invention may be practiced by an individual user, even when the individual user is interacting with another user.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Additionally, while embodiments of the disclosed invention are discussed in connection with desktop applications, it will be apparent to one of ordinary skill in the art that the invention may be used in other computer devices as described and claimed, including mobile devices.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention have been described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing software application states, comprising:
    selecting a plurality of applications wherein each of the plurality of applications includes a state, and wherein the plurality of applications are accessed collaboratively by a plurality of users;
    generating a plurality of data contexts based on the selected applications and their respective states for the plurality of users;
    pushing the plurality of data contexts onto a data stack; and
    popping the plurality of data contexts from the data stack to reinstate collaborative access by the plurality of users, wherein at least one of the above steps is performed using a program executable by a processor on a computer.

2. The method of claim 1, wherein one or more of the steps of the method are initiated by a user.

3. The method of claim 2, further comprising:
    providing a link for selection by the user to initiate one or more of the steps of the method.

4. The method of claim 2, further comprising:
    providing a keyboard shortcut for activation by the user to initiate one or more of the steps of the method.

5. The method of claim 1, wherein one or more steps of the method are performed at a specified time.

6. The method of claim 1, wherein the step of popping the data contexts includes presenting the states of the plurality of applications on a display for viewing by a user.

7. The method of claim 1, wherein the plurality of applications run on one or more hosts, the applications being usable by a plurality of users.

8. A system for managing software application states, comprising:
    a first computer having a processor, and a computer-readable storage device; and
    a program embodied on the storage device for execution by the processor, the program having a plurality of program modules, including:
        a selecting module configured to select a plurality of applications wherein each of the plurality applications includes a state, and wherein the plurality of applications are accessed collaboratively by a plurality of users;
        a generating module configured to generate a plurality of data contexts based on the selected applications and their respective states for the plurality of users;
        a pushing module configured to push the plurality of data contexts onto a data stack; and
        a popping module configured to pop the plurality of data contexts from the data stack to reinstate collaborative access by the plurality of users.

9. The system of claim 8, wherein the plurality of program modules further include:
    an initiating module configured to receive input from a user to direct initiation of one or more of the plurality of program modules.

10. The system of claim 9, wherein the initiating module is further configured to provide a link for selection by the user to initiate one or more of the plurality of program modules.

11. The system of claim 9, wherein the initiating module is further configured to provide a keyboard shortcut for activation by the user to initiate one or more of the plurality of program modules.

12. The system of claim 8, wherein one or more of the plurality of program modules are configured to execute at a specified time.

13. The system of claim 8, wherein the system further comprises a display, and the plurality of program modules further include:
    a displaying module configured to present the states of the plurality of applications on the display for viewing by a user.

14. The system of claim 8, further comprising a second computer having a processor and a computer-readable storage device, wherein the program is also embodied on the storage device of the second computer for execution by its processor, the plurality of program modules of the program on the first computer and the second computer further including:
    a coordinating module configured to coordinate the execution of the selecting, generating, pushing and popping the modules of the program on the first and second computers.

15. A computer program product for managing software application states, the computer program product comprising a computer-readable non-transitory storage medium having program code embodied therewith, the program code readable/executable by a first processor of a first computer to perform a method comprising:
    selecting a plurality of applications, by the processor, wherein each of the plurality of applications includes a state, and wherein the plurality of applications are accessed collaboratively by a plurality of users;
    generating a plurality of data contexts, by the processor, based on the selected applications and their respective states for the plurality of users;
    pushing the plurality of data contexts, by the processor, onto a data stack; and
    popping the plurality of data contexts, by the processor, from the data stack to reinstate collaborative access by the plurality of users.

16. The computer program product of claim 15, wherein execution of one or more steps of the method, by the processor, are initiated by a user.

17. The computer program product of claim 16, wherein the method includes providing a link to the user for selection, the selection of the link initiating execution by the processor of one or more of the steps of the method.

18. The computer program product of claim 16, wherein the method includes providing a keyboard shortcut to the user for activation, the activation of the keyboard shortcut initiating execution by the processor of one or more of the steps of the method.

19. The computer program product of claim 15, wherein one or more steps of the method are configured to be performed by the processor at a specified time.

20. The computer program product of claim 15, wherein the method further comprises:

coordinating the selecting, generating, pushing, and popping steps of the method between a plurality of processors each on a respective plurality of computers, including the first processor of the first computer, wherein each of the plurality of processors executes one or more steps of the method.

\* \* \* \* \*